US011463265B2

(12) United States Patent
Srinivasa et al.

(10) Patent No.: US 11,463,265 B2
(45) Date of Patent: Oct. 4, 2022

(54) DATA CENTER SECURITY MECHANISM

(71) Applicant: Hewlett Packard Enterprise Development LP, Houston, TX (US)

(72) Inventors: Sharath Karkada Srinivasa, Bangalore Karnataka (IN); Bindu Loganathan, Bangalore Karnataka (IN); Naveena Kedlaya, Bangalore Karnataka (IN); Rekha G, Bangalore Karnataka (IN); Varsha Anandani, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 174 days.

(21) Appl. No.: 16/839,255

(22) Filed: Apr. 3, 2020

(65) Prior Publication Data

US 2021/0314165 A1    Oct. 7, 2021

(51) Int. Cl.
*H04L 9/40*    (2022.01)
*H04L 9/32*    (2006.01)
*H04L 9/06*    (2006.01)

(52) U.S. Cl.
CPC .......... *H04L 9/3247* (2013.01); *H04L 9/0643* (2013.01)

(58) Field of Classification Search
CPC ............................ H04L 9/3247; H04L 9/0643
See application file for complete search history.

(56) References Cited

U.S. PATENT DOCUMENTS

| | | | |
|---|---|---|---|
| 7,882,221 B2 | 2/2011 | Sailer et al. | |
| 9,009,705 B2 | 4/2015 | Kundu et al. | |
| 10,534,805 B2 * | 1/2020 | Basak | G06F 11/3414 |
| 2007/0169001 A1 * | 7/2007 | Raghunath | G06F 9/44547 717/130 |
| 2009/0320045 A1 * | 12/2009 | Griffith | H04L 67/34 719/315 |
| 2010/0057740 A1 * | 3/2010 | Ni | G06F 9/466 707/E17.007 |
| 2014/0013325 A1 * | 1/2014 | Shimoni | G06F 21/575 718/1 |
| 2014/0108441 A1 * | 4/2014 | Samari | H04H 60/40 707/758 |
| 2014/0181984 A1 * | 6/2014 | Kundu | G06F 21/53 726/26 |
| 2015/0085872 A1 | 3/2015 | Palawat et al. | |

(Continued)

OTHER PUBLICATIONS

Kant et al., "Security Considerations in Data Center Configuration Management", Sep. 22, 2011, pp. 1-9.

(Continued)

*Primary Examiner* — Ghodrat Jamshidi
(74) *Attorney, Agent, or Firm* — Jaffery Watson Mendonsa & Hamilton (57) ABSTRACT

A system to facilitate data center security is described. The system includes a processor and a machine readable medium storing instructions that, when executed, cause the processor to receive a plurality of resources that are to be provided to process a workload, receive one or more characteristics associated with each of the plurality of resources, generate a resource signature for each of the plurality of resources using the one or more characteristics associated with each resource and generate an aggregated signature using the resource signatures generated for each of the plurality of resources.

20 Claims, 6 Drawing Sheets

(56) References Cited

U.S. PATENT DOCUMENTS

| | | | |
|---|---|---|---|
| 2016/0277190 A1* | 9/2016 | Soldevila | H04L 9/3231 |
| 2017/0109531 A1* | 4/2017 | Wang | H04L 9/3234 |
| 2019/0102539 A1* | 4/2019 | Durham | G06F 9/45554 |
| 2019/0123947 A1* | 4/2019 | Atungsiri | H04L 5/0044 |
| 2019/0220863 A1* | 7/2019 | Novick | G06Q 20/10 |
| 2020/0133707 A1* | 4/2020 | Coster | G06F 1/329 |
| 2020/0184026 A1* | 6/2020 | Espino | G06F 11/3457 |

OTHER PUBLICATIONS

Moore et al., "Gartner Forecasts Worldwide Information Security Spending to Exceed $124 Billion in 2019", Newsroom, Gartner, Inc., Aug. 15, 2018, 3 pages.

\* cited by examiner

DATA CENTER SECURITY MECHANISM

BACKGROUND

Data centers provide a pool of resources (e.g., computational, storage, network, etc.) that are interconnected via a communication network. In modern data center network architectures a network switching fabric typically serves as the core component that provides connectivity between the network resources, and facilitates the optimization of server to server (e.g., east-west) traffic in the data center. Such switching fabrics may be implemented using a software-defined transport fabric that interconnects a network of resources and hosts via a plurality of top of rack network (TOR) fabric switches.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Devices in software defined datacenters are typically grouped logically to form a single entity. In such systems, compute (e.g., central processing units (CPUs) and memory) resources from multiple physical devices (rack servers/blades/storage systems) are pooled for the execution of workloads (e.g., a quantity of processing to be executed by the compute resources). These systems and pools are pro-visioned/re-provisioned and scaled to provide resources to accommodate different workloads. However, each physical device is managed as an individual physical entity, although the devices may be logically connected and configured as a single logical entity. Thus, tampering and/or anomalies that impact the resource pool and the workload in such infrastructures are difficult to detect. Devices that have been tampered with may alter the behavior of the logical system, thus resulting in infrastructure security issues.

In embodiments, a mechanism is provided to facilitate datacenter security by generating a digital signature (or hash) of subsystems within a resource. In such an embodiment, the signature of each of a plurality of resources is derived by generating a hash value including values corresponding to one or more characteristics associated with the resource. In a further embodiment, an aggregated signature is generated by generating an aggregate hash value including the signatures generated for each of the plurality of resources. In still a further embodiment, a rack signature may be generated that includes the aggregated signature and the signature of the rack.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
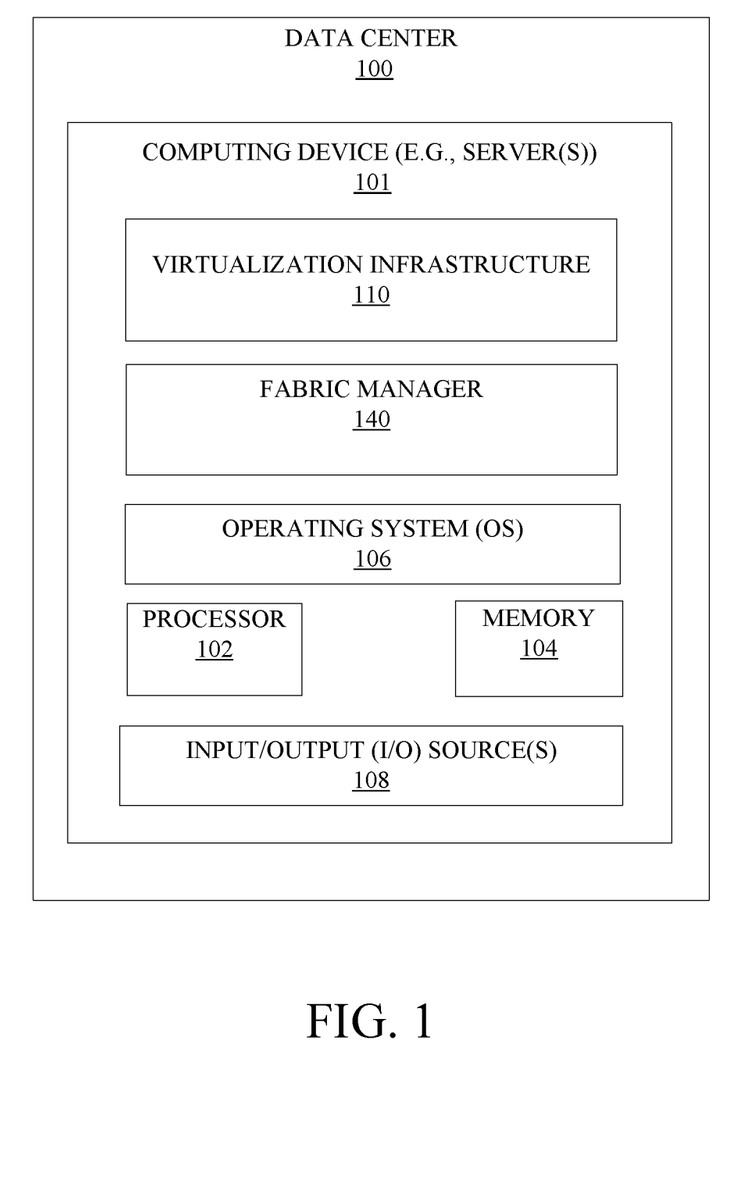
FIG. 1 illustrates one embodiment of a system employing a data center.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization of a plurality of host resources (or virtualization hosts) included within data center 100. In one embodiment, virtualization infrastructure 110 is implemented via a virtualized data center platform (including, e.g., a hypervisor), such as VMware vSphere. However other embodiments may implement different types of virtualized data center platforms. Computing device 101 also facilitates operation of a network switching fabric. In one embodiment, the network switching fabric is a software-defined transport fabric that provides connectivity between the host resources within virtualization infrastructure 110.

According to one embodiment, the network switching fabric may be implemented via a plurality of racks. Typically, a rack includes a metal frame to provide standardized structure to mount various rack devices, for example, servers, modems, storage systems, routers, and other equipment, such as power, cooling, and cable management resources, among others. Life cycle of the rack devices begins from the time devices are manufactured, assembled in the rack, and shipped to customer premises.

Figure 2:
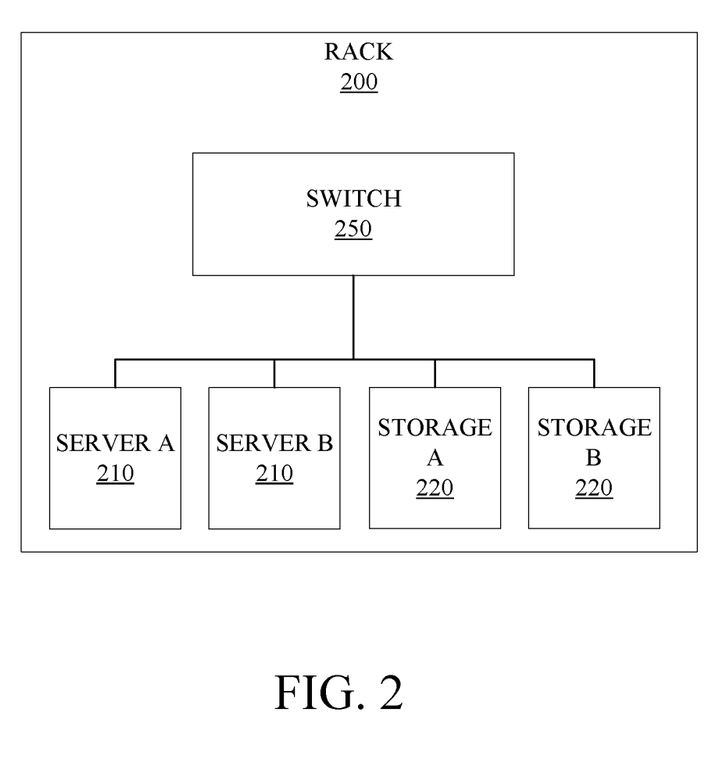
FIG. 2 is a block diagram illustrating one embodiment of a rack.

FIG. 2 is a block diagram illustrating one embodiment of a rack 200. As shown in FIG. 2, rack 200 includes servers 210 (e.g., 210A & 210B) and storage devices 220 (e.g., 220A & 220B) coupled via a switch 250. Once a rack, such as rack 200, reaches the customer premises and gets into operational phase, various management aspects of the rack, for example, fault, configuration, authentication, performance, and secure management of the rack starts through a management station. From the secure management aspect, it is important to maintain an integrity of the rack both during the transit phase and operational phase of the rack to avoid issues, such as legal, data security, and device security which may arise due to loss of any rack devices.

Figure 3:
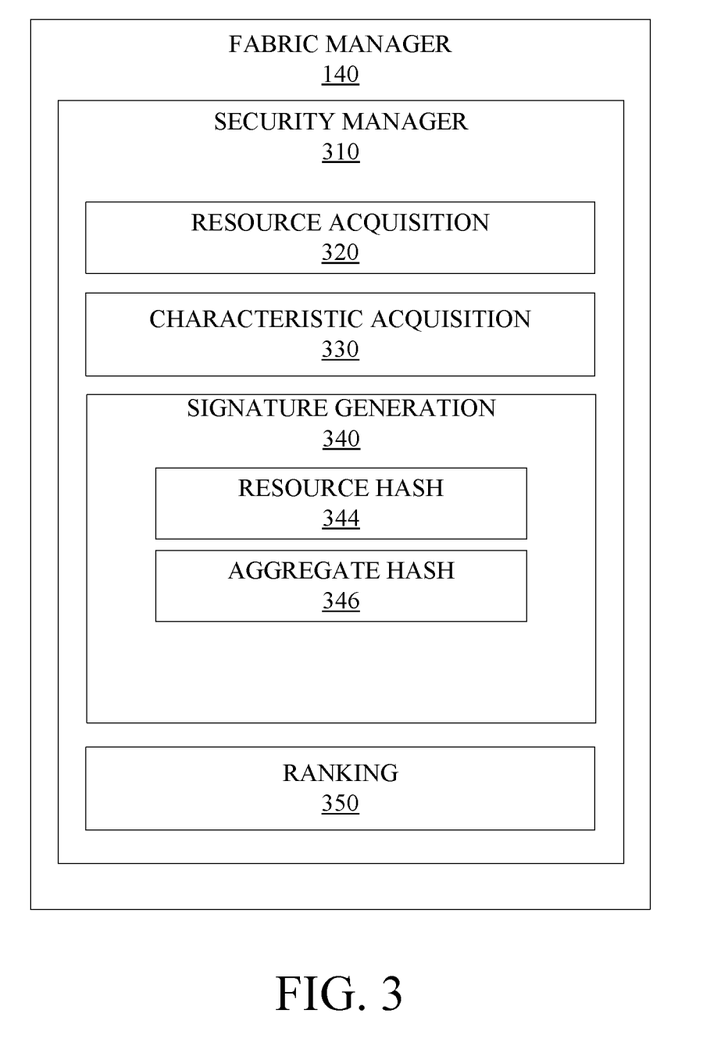
FIG. 3 is a block diagram illustrating one embodiment of a fabric manager.

Referring back to FIG. 1, a fabric manager 140 is included within computing device to manage the network switching fabric. In one embodiment, fabric manager operates as a management station to manage rack 200. FIG. 3 is a block diagram illustrating one embodiment of fabric manager 140. As shown in FIG. 3, fabric manager 140 includes a security manager 310. According to one embodiment, security manager 310 includes resource acquisition engine 320. Resource acquisition engine 320 determines (or receives) a list of resources that are to be provided to execute a workload. In one embodiment, a determination may be made that the components of rack 200 are to be provided as an entity to process a workload. In such an embodiment, resource acquisition engine 320 receives servers 210A & 210B for compute, storage devices 220A & 220B and switch 250 the list of resources. In a further embodiment, resource acquisition engine 320 may also receive software resources in the list.

Security manager 310 also includes characteristic acquisition engine 330 to receive characteristics of each resource included in the list of the resources. According to one embodiment, resource characteristics include various attributes of a device (e.g., model number, power topology, interfaces, port map, etc.). In addition, resource characteristics for a server may include attributes, such as a number and/or type of central processing units (CPUs), memory size, operating system, etc., while resource characteristics for a storage device may include attributes, such as a number and/or type of storage devices (e.g., hard disk drives (HDDs), solid stated drives (SSDs), and resource characteristics for a switch may include a number of ports, switch type, etc.

According to one embodiment, all of the received characteristics are inserted into a tabular structure (or table). Table 1 shows one embodiment of a characteristics table.

TABLE 1

| | $C_1$ | $C_2$ | $C_3$ | ... | $C_n$ |
|---|---|---|---|---|---|
| $Device_1$ | CPU capacity | Firmware version | Memory capacity | | |
| $Device_2$ | Storage capacity | Storage type | Number of drives | | |
| ... | | | | | |
| $Device_n$ | | | | | |

As shown above, Table 1 includes a list of characteristics (e.g., $C_1$-$C_n$) for each device (each $Device_1$-$Device_n$). For example, $Device_1$ comprises a compute resource having characteristics including CPU capacity, Firmware version, Memory capacity, etc. Similarly, $Device_1$ comprises a storage resource having characteristics including Storage capacity, Storage type, Number of drives, etc.

Signature generation engine 340 is implemented to generate digital signatures that are used during workload deployment (or re-provisioning) to verify the authenticity and integrity of workloads. According to one embodiment, signature generation engine 340 performs a cryptographic hash function to generate the digital signatures. In such an embodiment, signature generation engine 340 implements SecureHash Algorithm 2 (SHA-2) to generate the hashes. However different algorithms may be implemented in other embodiments.

In one embodiment, signature generation engine 340 generates a resource signature (or hash) 344 for each resource (e.g., in rack 200). In such an embodiment, a resource signature is a bit string value (or hash value) generated by applying a hash function on a string of data including the characteristics associated with the respective resource. Thus, a resource signature hash value for server 210A may be generated using characteristic information including power topology, port map and CPU type, etc. For example, a signature hash value generated for $Device_1$ in Table 1 would be generated by applying a hashing algorithm on a string of data including the plain text of values representing the CPU capacity, Firmware version, Memory capacity, etc., of $Device_1$ (or $H_1$). Similarly, a signature hash value generated for $Device_2$ would be generated by applying the hashing algorithm on a string of data including the plain text of values representing the Storage capacity, Storage type, Number of drives, etc., of $Device_2$ (or $H_2$). As a result, signature generation engine 340 performs a hash function on the characteristic information of each resource to generate an associated hash 344.

Figure 4:
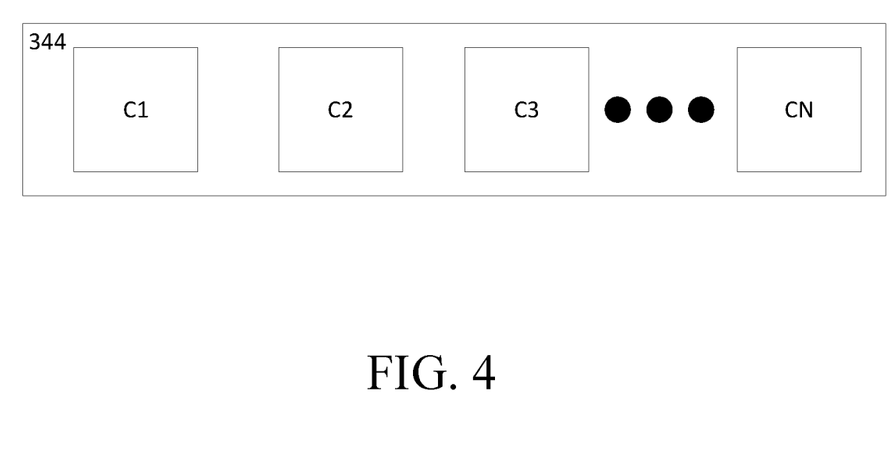
FIG. 4 illustrates one embodiment of resource hash components.

FIG. 4 illustrates one embodiment of components, including characteristics including characteristics C1-CN, implemented to generate resource hash 344. According to one embodiment, each hash 344 is inserted into the table and associated with its respective resource and characteristic entries in the table. In a further embodiment, resource signatures may also be generated for software resources (e.g., software configuration of software, such as BIOS, profiles).

Figure 5:
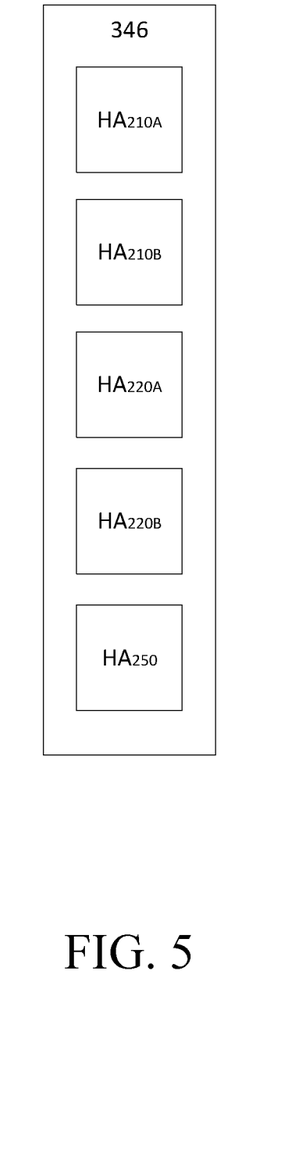
FIG. 5 illustrates one embodiment of aggregate hash components.

Signature generation engine 340 also generates an aggregate hash 346. In this embodiment, aggregate hash 346 comprises a hash value generated by applying the hash function on a string of data including the previously generated resource hash values. Thus, aggregate hash 346 is a hash generated from an aggregate of resource hashes 344. FIG. 5 illustrates one embodiment of aggregate hash 346. As shown in FIG. 5, aggregate hash 346 performs a hash of resource hashes for servers 210A & 210B for compute, storage devices 220A & 220B and switch 250. According to one embodiment, aggregate hash 346 is associated with a workload and is used to authenticate the workload prior to execution of the workload. In a further embodiment, signature generation engine 340 generates a rack signature that includes the aggregate hash 346 and characteristics of rack 200. In such an embodiment, the rack information includes a rack profile that is based on configuration of the physical devices, the logical devices, and the rack topology.

Security manager 310 also includes ranking engine 350 to perform a ranking of the resource hashes. According to on embodiment, ranking engine 350 generates a ranking of devices to provide a device order for generating an aggregate hash 346. For example, the order of resource hashes 344 must remain the same during generation of the aggregate hash 346 to ensure that the hash value remains the same. In on embodiment, ranking engine 350 performs a ranking operation to determine an order of each of the resource signatures in the table. In a further embodiment, the ranking operation is based on a resource type priority. In such an embodiment, the resource type priority provides an order in which the resources are to be placed in the aggregated hash (e.g., 1: Compute; 2: Storage; 3: Network, etc.).

Figure 6:
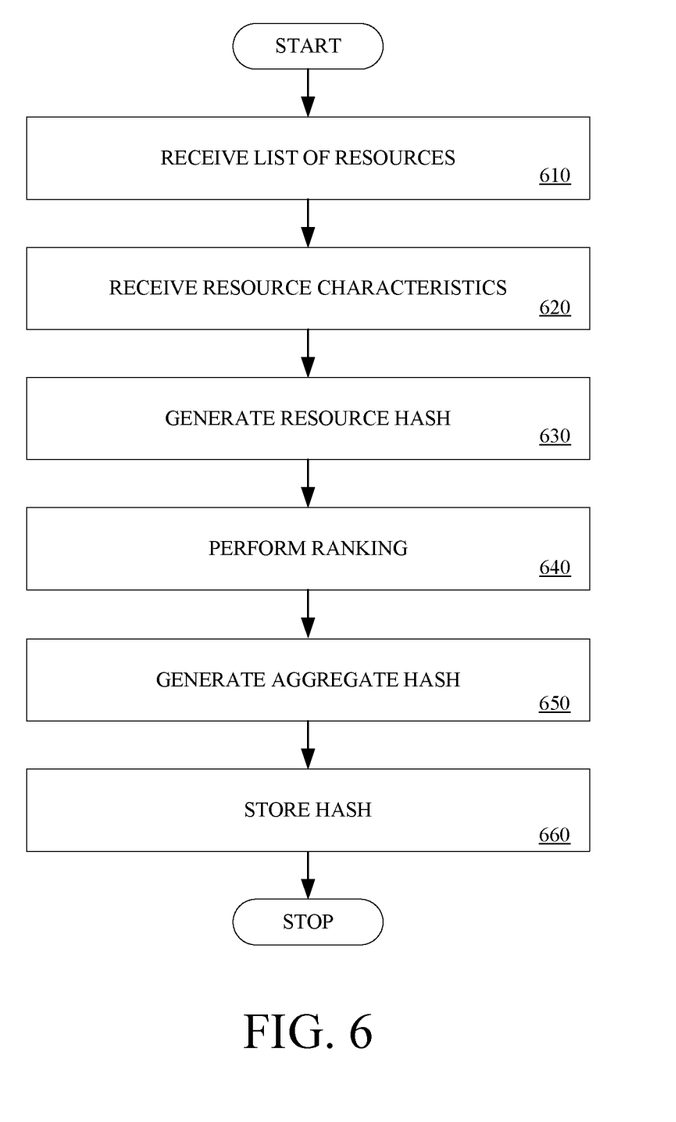
FIG. 6 is a flow diagram illustrating one embodiment of a method performed by a fabric manager.

FIG. 6 is a flow diagram illustrating one embodiment of a method performed by a fabric manager. At processing block 610, a list of resources is received. As discussed above the list of resources includes resources that are to be provided to execute a workload. At processing block 620, characteristics of each resource in the list of resources is received. At processing block 630, a resource hash is generated for each resource. As discussed above, generating a resource hash comprises applying a hash function to the resource characteristic information to. At processing block 640, a resource ranking is performed to determine an order of the resource hashes. At processing block 650, an aggregate hash is generated by applying a hash function to the resource hashes. As mentioned above, a rack hash may also be generated after generation of the aggregate hash. At processing block 660, the aggregate hash is stored as a master hash to be used for later comparison during workload deployment. In one embodiment, the aggregate hash is recalculated each time a workload is deployed for processing at rack 200 resources.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate datacenter security, comprising:
a processor; and
a non-transitory machine-readable medium storing instructions that, when executed, cause the processor to execute a security manager to:
determine a plurality of resources that are to be provided to execute a workload;
receive one or more characteristics associated with each of the plurality of resources;
generate a resource signature for each of the plurality of resources using the one or more characteristics associated with each resource;
generate an aggregated signature using the resource signatures generated for each of the plurality of resources; and
associate the aggregated signature with the workload, wherein the aggregated signature comprises a bit string hash value.

2. The system of claim 1, wherein a resource signature comprises a hash value generated by applying a hash function on a string of data including the characteristics associated with the plurality of resources.

3. The system of claim 2, wherein the characteristics comprise one or more attributes of a resource.

4. The system of claim 3, wherein the security manager further generates a table comprising each of the resource signatures.

5. The system of claim 4, wherein the security manager further performs a ranking operation to determine an order of each of the resource signatures in the table and the ranking operation is based on a resource type priority.

6. The system of claim 3, wherein the plurality of resources are located within a rack.

7. The system of claim 6, wherein the plurality of resources comprise server, storage, networking and software resources.

8. The system of claim 6, wherein the security manager further generates a rack signature based on characteristics of the rack.

9. The system of claim 8, wherein the aggregated signature comprises the rack signature and the resource signatures.

10. The system of claim 1, wherein the aggregated signature is used to authenticate the workload prior to execution of the workload.

11. A method to facilitate data center security, comprising:
determining a plurality of resources that are to be provided to execute a workload;
receiving one or more characteristics associated with each of the plurality of resources;

generating a resource signature for each of the plurality of resources using the one or more characteristics associated with each resource;

generating an aggregated signature using the resource signatures generated for each of the plurality of resources; and associating the aggregated signature with the workload, wherein the aggregated signature comprises a bit string hash value.

12. The method of claim 11, wherein a resource signature comprises a hash value generated by applying a hash function on a string of data including the characteristics associated with the plurality of resources.

13. The method of claim 12, wherein the characteristics comprise one or more attributes of a resource.

14. The method of claim 13, further comprising generating a table comprising each of the resource signatures.

15. The method of claim 14, further comprising performing a ranking operation to determine an order of each of the resource signatures in the table.

16. A non-transitory machine-readable medium storing instructions which, when executed by a processor, cause the processor to:

determine a plurality of resources that are to be provided to execute a workload;

receive one or more characteristics associated with each of the plurality of resources;

generate a resource signature for each of the plurality of resources using the one or more characteristics associated with each resource;

generate an aggregated signature using the resource signatures generated for each of the plurality of resources; and associate the aggregated signature with the workload, wherein the aggregated signature comprises a bit string hash value.

17. The non-transitory machine-readable medium of claim 16, wherein a resource signature comprises a hash value generated by applying a hash function on a string of data including the characteristics associated with the plurality of resources.

18. The non-transitory machine-readable medium of claim 17, wherein the characteristics comprise one or more attributes of a resource.

19. The non-transitory machine-readable medium of claim 16, storing instructions which, when executed by a processor, cause the processor to generate a table comprising each of the resource signatures.

20. The non-transitory machine-readable medium of claim 19, storing instructions which, when executed by a processor, cause the processor to perform a ranking operation to determine an order of each of the resource signatures in the table.

* * * * *